UNITED STATES PATENT OFFICE.

THOR MEJDELL, OF CHRISTIANIA, NORWAY, ASSIGNOR TO A/S. LABRADOR, OF CHRISTIANIA, NORWAY, A BUSINESS ENTITY OF CHRISTIANIA, NORWAY.

PROCESS FOR THE PRODUCTION OF ALUMINA FROM ALUMINUM-NITRATE SOLUTIONS.

1,413,754. Specification of Letters Patent. Patented Apr. 25, 1922.

No Drawing. Application filed September 7, 1920. Serial No. 408,692.

*To all whom it may concern:*

Be it known that I, THOR MEJDELL, a subject of the King of Norway, and a resident of Christiania, Kingdom of Norway, have invented certain new and useful Improvements in Processes for the Production of Alumina from Aluminum-Nitrate Solutions of which the following is a specification.

This invention relates to aluminum nitrate solutions, and the object of the invention is a process whereby alumina may be produced from such solutions in a simple and economical manner.

If an aluminum nitrate solution is evaporated, the specific gravity of the solution will gradually increase, while at the same time nitric acid vapors will distill off. Further the temperature of the nitrate solution will rise, and when it has reached 145—150° C., the mass will solidify. It will then be found that only about 25% of the combined nitric acid has been split off. If, however, the evaporation is not carried so far that a solid mass is obtained, and if water is added in some form or other to keep the temperature of the nitrate solution constant, I have found that the mass will then remain liquid and a considerably greater quantity of nitric acid may be split off. The remaining nitrate mass will continuously become more and more basic. Experiments have thus demonstrated that by maintaining the temperature at about 140° C., and leading steam through, 80% of the combined nitric acid may be split off without the mass solidifying. At a certain basicity the principal amount of the alumina will precipitate in the form of a crystalline basic aluminum nitrate poor in water. This crystalline mass possesses the important advantage, as compared with the usual precipitate of alumina, of being very easily filterable. The precipitate may be filtered from the solution and will if heated be decomposed, thereby developing nitrous gases without fusing, and the complete driving off of these gases will therefore cause no trouble. The gases may of course be used for the production of new amounts of nitric acid.

The form of carrying out the present invention may be varied within wide limits. It thus depends upon the composition of the nitrate solution in each case, how far one must evaporate before precipitation. Further the foreign substances contained in the solution determine how far it is advantageous to carry the precipitation and the splitting off of nitric acid. In case the solution contains iron, less iron will precipitate together with the alumina than might be expected from the composition of the solution; especially the first precipitate will be very poor in iron. If the precipitation is continuously carried further, the iron content of the precipitate will increase considerably. Other methods may however be employed to recover the remainder of alumina, and the present process will then constitute a means of recovering alumina practically free from iron from nitrate solutions containing iron. As the raw materials for the production of alumina generally contain iron, it is easy to see the great advantage offered by my process. I may modify my process by first neutralizing a part of the acid in the solution to be treated by adding a neutralizing agent such as limestone, burnt lime or others, and then carry out the distillation process as above described.

A further modification consists in employing an autoclave for heating the solution to be treated under increased pressure. The precipitation of basic aluminum nitrate is thereby facilitated. Before heating the solution in the autoclave the desired basicity may be obtained by neutralization or by distilling off a part of the acid present.

I have found it advantageous to carry out the precipitation in solutions containing in addition to aluminum nitrate, nitrates which at the temperature in question remain in solution, such as calcium nitrate and sodium nitrate. This will cause the solution to remain more fluid, and I may consequently precipitate more alumina.

The heating of the solution may be carried out in any well known way, but I prefer to heat the solution by means of steam which I lead through. The presence of a large amount of steam above the solution will favor the evaporation of nitric acid and partly prevent evaporation of water on account of its effect on the vapor pressure.

In the following specific example I have illustrated a suitable way of carrying out my present invention.

As a raw material I employ an aluminum nitrate solution containing per 100 cc. 6.5 g. $Al_2O_3$, 3 g. CaO and small amounts of Fe and Na. The solution is led to a suitable evaporation vessel for example of tantiron, and is heated to boiling by means of superheated steam. I conduct the heating to maintain the temperature constant at 140° C. This is done by introducing fresh solution when the temperature rises. During the boiling crystalline basic aluminum nitrate separates out and is removed by continuously letting out a part of the solution with the precipitate contained therein and filtering or in other manner removing the precipitate. The calcium nitrate or sodium nitrate, respectively, present in the solution remains dissolved, and is thus obtained in the filtrate. During the boiling nitric acid of a concentration of about 18 g. $HNO_3$ per 100 cc. distills off. This is condensed in known manner, and is collected to be used for the dissolution of new amounts of raw materials. The amount of nitric acid distilled off corresponds to about 60 % of the aluminum nitrate present. The remaining 40% stays in the precipitate which is filtered off and is recovered in the form of nitrous gases by further heating the basic aluminum nitrate, whereby this is decomposed into alumina and nitrous gases. The alumina is dried and calcined at 1000° C. and practically pure $Al_2O_3$ is then obtained, which among other uses is very well adapted for the manufacture of aluminum.

The filtrate from the precipitated basic aluminum nitrate contains 20—30% of the original aluminum in the form of a slightly basic aluminum nitrate, as well as calcium nitrate and sodium nitrate. To this filtrate I add as much nitric acid as is needed to form normal nitrates, whereupon the solution is evaporated to the points of obtaining a crystallization of $Al_2(NO_3)_6$ 15 aq. The crystals are removed and the remaining solution which contains about 2—3% of original alumina as well as $Ca(NO_3)_2$ and $NaNO_3$ is evaporated. The recovered salts are collected and are very well adapted for use as fertilizers.

The crystallized aluminum nitrate may either be employed as such or may be carried back to the original solution. Thus according to my present invention practically the total amount of alumina in the nitrate solution is recovered, and at the same time 60% of the nitric acid combined in the form of aluminum nitrate is recovered directly as 20% $HNO_3$, the remainder being recovered in the form of nitrous gases. Instead of transforming the precipitated basic aluminum nitrate to alumina by heating, I may of course employ other known methods for this purpose.

The above detailed example has been given for clearness of understanding only, and no undue limitation should be deduced therefrom, but the appended claims should be construed as broadly as permissible in view of the prior art.

What I claim as new and desire to secure by Letters Patent of the United States is:

1. The process for recovery of alumina from solutions containing aluminum nitrate which comprises heating the solution until nitric acid distills off, adding so much water as is necessary to keep the temperature of the solution practically constant, and separating the precipitated basic aluminum nitrate from the solution.

2. The process for recovery of alumina from solutions containing aluminum nitrate which comprises heating the solution until nitric acid distills off, adding so much water as is necessary to keep the temperature of the solution practically constant, filtering the precipitated basic aluminum nitrate from the solution and calcining it.

3. The process for recovery of alumina from solutions containing aluminum nitrate which comprises heating the solution until nitric acid distills off, adding a solution of aluminum nitrate containing so much water as is necessary to keep the temperature of the solution practically constant and separating the precipitated basic aluminum nitrate from the solution.

4. The process for recovery of alumina from solutions containing aluminum nitrate which comprises heating the solution until nitric acid distills off, adding a solution of aluminum nitrate containing so much water as is necessary to keep the temperature of the solution practically constant, filtering the precipitated basic aluminum nitrate from the solution and calcining it.

5. The process for recovery of alumina from solutions containing aluminum nitrate which comprises heating the solution until nitric acid distills off, continuously adding a solution of aluminum nitrate containing so much water as is necessary to keep the temperature of the solution practically constant, continuously removing solution with precipitate contained therein and separating the precipitate from the solution.

6. The process for recovery of alumina from solutions containing aluminum nitrate which comprises heating the solution until nitric acid distills off, continuously adding a solution of aluminum nitrate containing so much water as is necessary to keep the temperature of the solution practically constant, continuously removing solution with precipitate contained therein, separating the precipitate from the solution and calcining it.

7. The process for recovery of almuina from solutions containing aluminum nitrate which comprises heating the solution until nitric acid distills off, adding a solution containing aluminum nitrate, calcium nitrate and so much water as is necessary to keep the temperature of the solution practically constant, continuously removing solution and precipitate and separating the precipitated basic aluminum nitrate from the solution.

8. The process for recovery of alumina from solutions containing aluminum nitrate which comprises heating the solution until nitric acid distills off, adding a solution containing aluminum nitrate, calcium nitrate and so much water as is necessary to keep the temperature of the solution practically constant, continuously removing solution and precipitate, filtering the precipitated basic aluminum nitrate from the solution and calcining it.

9. The process for recovery of alumina from solutions containing aluminum nitrate which comprises heating the solution until nitric acid distills off, adding a solution containing aluminum nitrate, calcium nitrate sodium nitrate and so much water as is necessary to keep the temperature of the solution practically constant, continuously removing solution and precipitate and separating the precipitated basic aluminum nitrate from the solution.

10. The process for recovery of alumina from solutions containing aluminum nitrate which comprises heating the solution until nitric acid distills off, adding a solution containing aluminum nitrate, calcium nitrate, sodium nitrate and so much water as is necessary to keep the temperature of the solution practically constant, continuously removing solution and precipitate, filtering the precipitated basic aluminum nitrate from the solution and calcining it.

11. The process for recovery of alumina for solutions containing aluminum nitrate and also a comparatively small amount of ferric nitrate which comprises heating the solution until nitric acid distills off and adding so much water as is necessary to keep the temperature of the solution practically constant, continuing the heating until approximately 80% of the alumina present has been precipitated in the form of basic aluminum nitrate, filtering the precipitate from the solution and calcining it to form $Al_2O_3$, adding to the solution so much nitric acid as is necessary to form normal nitrates, and evaporating until a crystallization of $Al_2(NO_3)_6$ 15 aq. is obtained, separating the crystals from the mother liquor and evaporating the latter to dryness.

12. The process for recovery of alumina from solutions containing aluminum nitrate and also a comparatively small amount of ferric nitrate which comprises heating the solution until nitric acid distills off and adding so much water as is necessary to keep the temperature of the solution practically constant as approximately 140° C. and continuing the heating until approximately 80% of the alumina present has been precipitated in the form of basic aluminum nitrate, filtering the precipitate from the solution and calcining it to form $Al_2O_3$, adding to the solution so much nitric acid as is necessary to form normal nitrates, and evaporating until a crystallization of $Al_2(NO_3)_6$ 15 aq. is obtained, separating the crystals from the mother liquor and evaporating the latter to dryness.

13. The process for recovery of alumina from solutions containing aluminum nitrate and also a comparatively small amount of ferric nitrate which comprises heating the solution until nitric acid distills off by leading steam through said solution, adding so much water as is necessary to keep the temperature of the solution practically constant, and separating the precipitated basic aluminum nitrate from the solution.

14. The process for recovery of alumina from solutions containing aluminum nitrate which comprises heating the solution by leading steam through said solution until nitric acid distills off, adding so much water as is necessary to keep the temperature of the solution practically constant, filtering the precipitated basic aluminum nitrate from the solution and calcining it.

15. The process for recovery of alumina from solutions containing aluminum nitrate which comprises heating the solution by leading steam through said solution until nitric acid distills off, adding a solution of aluminum nitrate containing so much water as is necessary to keep the temperature of the solution practically constant and filtering the precipitated basic aluminum nitrate from the solution.

16. The process for recovery of alumina from solutions containing aluminum nitrate which comprises heating the solution by leading steam through said solution until nitric acid distills off, adding a solution of aluminum nitrate containing so much water as is necessary to keep the temperature of the solution practically constant, filtering the precipitated basic aluminum nitrate from the solution and calcining it.

17. The process for recovery of alumina from solutions containing aluminum nitrate which comprises heating the solution by leading steam through said solution until nitric acid distills off, continuously adding a solution of aluminum nitrate containing so much water as is necessary to keep the temperature of the solution practically constant, continuously removing solution with precipitate contained therein and separating the precipitate from the solution.

18. The process for recovery of alumina from solutions containing aluminum nitrate which comprises heating the solution by leading steam through said solution until nitric acid distills off, continuously adding a solution of aluminum nitrate containing so much water as is necessary to keep the temperature of the solution practically constant, continuously removing solution with precipitate contained therein, separating the precipitate from the solution and calcining it.

19. The process for recovery of alumina from solutions containing aluminum nitrate which comprises heating the solution by leading steam through said solution until nitric acid distills off, adding a solution containing aluminum nitrate, calcium nitrate and so much water as is necessary to keep the temperature of the solution practically constant, continuously removing solution and precipitate and filtering the precipitated basic aluminum nitrate from the solution.

20. The process for recovery of alumina from solutions containing aluminum nitrate which comprises heating the solution by leading steam through said solution until nitric acid distills off, adding a solution containing aluminum nitrate, calcium nitrate and so much water as is necessary to keep the temperature of the solution practically constant, continuously removing solution and precipitate, filtering the precipitated basic aluminum nitrate from the solution and calcining it.

21. The process for recovery of alumina from solutions containing aluminum nitrate which comprises heating the solution by leading steam through said solution until nitric acid distills off, adding a solution containing aluminum nitrate, calcium nitrate, sodium nitrate and so much water as is necessary to keep the temperature of the solution practically constant, continuously removing solution and precipitate and filtering the precipitated basic aluminum nitrate from the solution.

22. The process for recovery of alumina from solutions containing aluminum nitrate which comprises heating the solution by leading steam through said solution until nitric acid distills off, adding a solution containing aluminum nitrate, calcium nitrate, sodium nitrate and so much water as is necessary to keep the temperature of the solution practically constant, continuously removing solution and precipitate, filtering the precipitated basic aluminum nitrate from the solution and calcining it.

23. The process for recovery of alumina from solutions containing aluminum nitrate and also a comparatively small amount of ferric nitrate which comprises heating the solution by leading steam through said solution until nitric acid distills off and adding so much water as is necessary to keep the temperature of the solution practically constant, continuing the heating until approximately 80% of the alumina present has been precipitated in the form of basic aluminum nitrate, filtering the precipitate from the solution and calcining it to form $Al_2O_3$, adding to the solution so much nitric acid as is necessary to form nitrates and evaporating until a crystallization of $Al_2(NO_3)_6$ 15 aq. is obtained, separating the crystals from the mother liquor and evaporating the latter to dryness.

24. The process for recovery of alumina from solutions containing aluminum nitrate and also a comparatively small amount of ferric nitrate which comprises heating the solution by leading steam through said solution until nitric acid distills off and adding so much water as is necessary to keep the temperature of the solution practically constant at approximately 140° C. and continuing the heating until approximately 80% of the alumina present has been precipitated in the form of basic aluminum nitrate, filtering the precipitate from the solution and calcining it to form $Al_2O_3$, adding to the solution so much nitric acid as is necessary to form normal nitrates, and evaporating until a crystallization of $Al_2(NO_3)_6$ 15 aq. is obtained, separating the crystals from the mother liquor and evaporating the latter to dryness.

Signed at Christiania, Norway, this 12th day of August, 1920.

THOR MEJDELL.